United States Patent
Kilpeläinen

(10) Patent No.: US 10,209,066 B2
(45) Date of Patent: Feb. 19, 2019

(54) MEASURING THE POSITION OF AN INSTALLATION PLATFORM IN AN ELEVATOR SHAFT USING LASER TRANSMITTERS AND LIGHT DETECTORS

(71) Applicant: KONE Corporation, Helsinki (FI)

(72) Inventor: Pekka Kilpeläinen, Oulu (FI)

(73) Assignee: KONE CORPORATION, Helsinki (FI)

( * ) Notice: Subject to any disclaimer, the term of this patent is extended or adjusted under 35 U.S.C. 154(b) by 325 days.

(21) Appl. No.: 15/202,183

(22) Filed: Jul. 5, 2016

(65) Prior Publication Data
US 2017/0038204 A1 Feb. 9, 2017

(30) Foreign Application Priority Data

Aug. 7, 2015 (EP) .................................. 15180154

(51) Int. Cl.
| | | |
|---|---|---|
| B66B 1/20 | (2006.01) | |
| G01C 3/08 | (2006.01) | |
| B66B 19/00 | (2006.01) | |
| B66B 19/06 | (2006.01) | |
| B66B 9/00 | (2006.01) | |

(52) U.S. Cl.
CPC ............ *G01C 3/08* (2013.01); *B66B 19/00* (2013.01); *B66B 19/002* (2013.01); *B66B 19/06* (2013.01); *B66B 9/00* (2013.01)

(58) Field of Classification Search
CPC ......... G01C 3/08; B66B 19/00; B66B 19/002; B66B 19/06; B66B 9/00

USPC ....... 187/249, 251, 391, 393, 394, 411, 414; 52/741.1; 29/407.04, 428, 429, 464; 356/3, 622, 623, 625, 629; 104/127
See application file for complete search history.

(56) References Cited

U.S. PATENT DOCUMENTS

| | | | | |
|---|---|---|---|---|
| 5,151,562 | A * | 9/1992 | Fujita ................... | B66B 1/3492 187/394 |
| 6,554,107 | B2 * | 4/2003 | Yumura .................. | B66B 1/34 187/247 |
| 8,256,582 | B2 * | 9/2012 | Qiu ........................ | B66B 19/00 187/391 |

(Continued)

FOREIGN PATENT DOCUMENTS

| | | | |
|---|---|---|---|
| EP | 2 733 105 A1 | 5/2014 | |
| GB | 2211046 A * | 6/1989 | ........... B66B 1/3492 |

(Continued)

*Primary Examiner* — Anthony Salata
(74) *Attorney, Agent, or Firm* — Birch, Stewart, Kolasch & Birch, LLP

(57) ABSTRACT

An arrangement includes an installation platform arranged to be movable upwards and downwards in a first direction in the elevator shaft, and two laser transmitters arranged at a bottom of the elevator shaft. Each of the two laser transmitters produce a vertical upwards directed laser plane in the elevator shaft, the laser planes being perpendicular to each other. At least four primary light sensitive detectors are attached to the installation platform so that they are visible to the laser transmitters, each of the primary light sensitive detectors being positioned on a respective side of a rectangle. The position of the installation platform in relation to the elevator shaft can be measured from the hitting points of the laser planes on the primary light sensitive detectors.

20 Claims, 5 Drawing Sheets

Legend
12 - bottom of elevator shaft
20 - elevator shaft
100 - Installation platform
210, 220 - laser transmitters
310, 320, 330, 340, 350, 360, 370, 380 - light sensitive detectors
400 - control unit

(56) References Cited

U.S. PATENT DOCUMENTS

| | | | |
|---|---|---|---|
| 8,400,644 B2* | 3/2013 | Juvonen | B66B 19/002 356/625 |
| 9,334,142 B2* | 5/2016 | Menchini | B66B 19/002 |
| 9,561,938 B2* | 2/2017 | Kilpelainen | B66B 19/00 |
| 9,592,997 B2* | 3/2017 | Mertala | B66B 19/002 |
| 9,751,728 B2* | 9/2017 | Mertala | E04G 3/246 |
| 9,828,212 B2* | 11/2017 | Vaarala | B66B 5/00 |
| 9,845,226 B2* | 12/2017 | Baker | B66B 19/002 |
| 2009/0266651 A1* | 10/2009 | Van Der Meijden | B66B 19/002 187/408 |
| 2013/0025236 A1 | 1/2013 | Erny et al. | |
| 2017/0313553 A1* | 11/2017 | Puntener | B66B 19/002 |
| 2018/0172439 A1* | 6/2018 | Kilpelainen | B66B 19/002 |

FOREIGN PATENT DOCUMENTS

| | | |
|---|---|---|
| JP | 6-147824 A | 5/1994 |
| JP | 5481513 B2 | 4/2014 |

\* cited by examiner

Legend
20 - elevator shaft
21C, 21D - walls of elevator shaft
42 - counter weight
51, 52 - elevator car guide rails
60 - fastening means
70 - gliding means
100 - installation platform
120, 140 - support arms of installation platform

Legend
12 - bottom of elevator shaft
20 - elevator shaft
100 - installation platform
210, 220 - laser transmitters
310, 320, 330, 340, 350, 360, 370, 380 - light sensitive detectors
400 - control unit Legend
100 - installation platform
310, 320, 330, 340 - light sensitive detectors

MEASURING THE POSITION OF AN INSTALLATION PLATFORM IN AN ELEVATOR SHAFT USING LASER TRANSMITTERS AND LIGHT DETECTORS

FIELD OF THE INVENTION

The invention relates to an arrangement and a method for measuring the position of an installation platform in an elevator shaft.

BACKGROUND ART

An elevator comprises an elevator car, lifting machinery, ropes, and a counterweight. The elevator car is supported on a transport frame being formed by a sling or a car frame. The sling surrounds the elevator car. The lifting machinery moves the car upwards and downwards in a vertically extending elevator shaft. The sling and thereby also the elevator car are carried by the ropes, which connect the elevator car to the counterweight. The sling is further supported with gliding means at guide rails extending in the vertical direction in the elevator shaft. The gliding means can comprise rolls rolling on the guide rails or gliding shoes gliding on the guide rails when the elevator car is mowing upwards and downwards in the elevator shaft. The guide rails are supported with fastening means on the side wall structures of the elevator shaft. The gliding means engaging with the guide rails keep the elevator car in position in the horizontal plane when the elevator car moves upwards and downwards in the elevator shaft. The counterweight is supported in a corresponding way on guide rails supported with fastening means on the wall structure of the elevator shaft. The elevator car transports people and/or goods between the landings in the building. The elevator shaft can be formed so that one or several of the side walls are formed of solid walls and/or so that one or several of the side walls are formed of an open steel structure. The guide rails are formed of guide rail elements of a certain length.

BRIEF DESCRIPTION OF THE INVENTION

An object of the present invention is to present a novel arrangement and method for measuring the position of an installation platform in an elevator shaft.

The arrangement for measuring the position of an installation platform in an elevator shaft.

The arrangement for measuring the position of an installation platform in an elevator shaft is characterised in that:

the installation platform is arranged to be movable upwards and downwards in a first direction in the elevator shaft, two laser transmitters are arranged at a bottom of the elevator shaft, each of said two laser transmitters producing a vertical upwards directed laser plane in the elevator shaft, said laser planes being perpendicular to each other, at least four primary light sensitive detectors are attached to the installation platform so that they are visible to the laser transmitters, each of the primary light sensitive detectors being positioned on a respective side of a rectangle, whereby the position of the installation platform in relation to the elevator shaft can be measured from the hitting points of the laser planes on the primary light sensitive detectors.

The method for measuring the position of an installation platform in an elevator shaft.

The method for measuring the position of an installation platform in an elevator shaft comprises the steps of:

arranging an installation platform to be movable upwards and downwards in a first direction in the elevator shaft, arranging two laser transmitters at a bottom of the elevator shaft, each of said two laser transmitters producing a vertical upwards directed laser plane in the elevator shaft, said laser planes being perpendicular to each other, arranging at least four primary light sensitive detectors on the installation platform so that they are visible to the laser transmitters, each of primary the light sensitive detector being positioned on a respective side of a rectangle, measuring the position of the installation platform in relation to the elevator shaft from the hitting points of the laser planes on the primary light sensitive detectors.

The invention makes it possible to measure the position of the installation platform in the elevator shaft during installation of the guide rails and the landing doors. One or both of the laser planes can also be used as a reference when aligning the guide rails.

The invention is especially suitable to be used in high rise buildings where the hoisting height in the elevator shaft is over 75 meters, preferably over 100 meters, more preferably over 150 meters, most preferably over 250 meters. The alignment of the rails becomes crucial in high rise buildings in order to achieve a smooth ride.

The installation platform can be equipped with suitable industry robots performing a robotic installation of the guide rails. A prerequisite for such a robotic installation of the guide rails is to be able to measure the position of the installation platform in relation to the elevator shaft.

BRIEF DESCRIPTION OF THE DRAWINGS

The invention will in the following be described in greater detail by means of preferred embodiments with reference to the attached drawings, in which.

DETAILED DESCRIPTION OF EMBODIMENTS OF THE INVENTION

Figure 1:
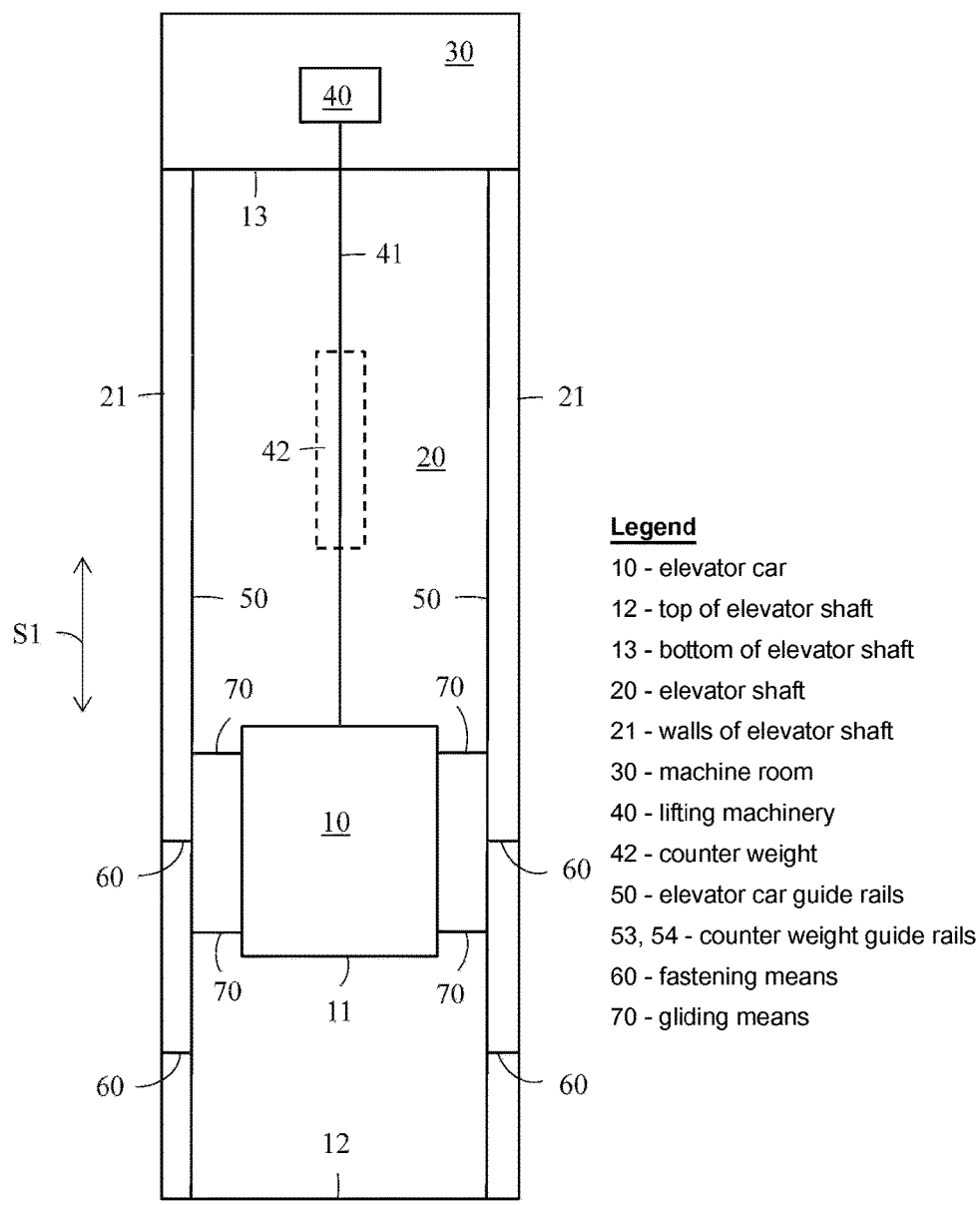
FIG. 1 shows a vertical cross section of an elevator.
Figure 2:
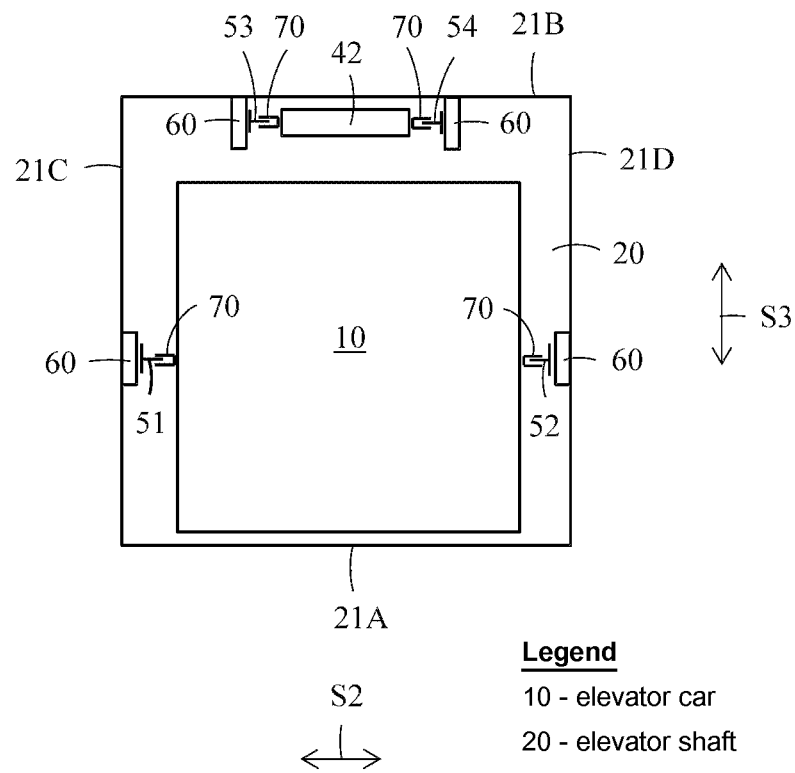
FIG. 2 shows a horizontal cross section of the elevator.

FIG. 1 shows a vertical cross section and FIG. 2 shows a horizontal cross section of an elevator.

The elevator comprises a car 10, an elevator shaft 20, a machine room 30, lifting machinery 40, ropes 41, and a counter weight 42. The car 10 may be supported on a transport frame 11 or a sling surrounding the car 10. The lifting machinery 40 moves the car 10 in a first direction S1 upwards and downwards in a vertically extending elevator shaft 20. The sling 11 and thereby also the elevator car 10 are carried by the ropes 41, which connect the elevator car 10 to the counter weight 42. The sling 11 and thereby also the elevator car 10 is further supported with gliding means 70 at guide rails 50 extending in the vertical direction in the elevator shaft 20. The elevator shaft 20 has a bottom 12, a top 13, a front wall 21A, a back wall 21B, a first side wall positioned on opposite side walls 210, 21D of the elevator shaft 20. The gliding means 70 can comprise rolls rolling on the guide rails 50 or gliding shoes gliding on the guide rails 50 when the elevator car 10 is mowing upwards and downwards in the elevator shaft 20. There are further two counter weight guide rails 53, 54 positioned at the back wall 21B of the elevator shaft 20. The counter weight 42 is supported with corresponding gliding means 70 on the counter weight guide rails 53, 54. The landing doors (not shown in the figure) are positioned in connection with the front wall 21A of the elevator shaft 20.

Each car guide rail 51, 52 is fastened with fastening means 60 at the respective side wall 210, 21D of the elevator shaft 20 along the height of the car guide rail 51, 52. Each counter weight guide rail 53, 54 is fastened with corresponding fastening means 60 at the back wall 21B of the elevator shaft 20 along the height of the counter weight guide rail 53, 54. The figure shows only two fastening means 60, but there are several fastening means 60 along the height of each guide rail 50. The cross section of the guide rails 50 can have the form of a letter T. The vertical branch of the guide rail element 50 forms three gliding surfaces for the gliding means 70 comprising rolls or gliding shoes. There are thus two opposite side gliding surfaces and one front gliding surface in the guide rail 50. The cross-section of the gliding means 70 can have the form of a letter U so that the inner surface of the gliding means 70 sets against the three gliding surfaces of the guide rail 50. The gliding means 70 are attached to the sling 11 and/or to the counter weight 42.

The gliding means 70 engage with the guide rails 50 and keep the elevator car 10 and/or the counter weight 42 in position in the horizontal plane when the elevator car 10 and/or the counter weight 42 moves upwards and downwards in the first direction S1 in the elevator shaft 20. The elevator car 10 transports people and/or goods between the landings in the building. The elevator shaft 20 can be formed so that all side walls 21, 21A, 21B, 210, 21D are formed of solid walls or so that one or several of the side walls 21, 21A, 21B, 210, 21D are formed of an open steel structure.

The guide rails 50 extend vertically along the height of the elevator shaft 20. The guide rails 50 are thus formed of guide rail elements of a certain length e.g. 5 m. The guide rail elements 50 are installed end-on-end one after the other.

FIG. 1 shows a first direction S1, which is a vertical direction in the elevator shaft 20. FIG. 2 shows a second direction S2, which is the direction between the first side wall 21C and the second side wall 21D in the elevator shaft 20. The distance between the guide rails (DBG) is measured in this second direction S2. FIG. 2 shows further a third direction S3, which is the direction between the back wall 21B and the front wall 21A in the elevator shaft 20 i.e. the back to front direction (BTF). The second direction S2 is perpendicular to the third direction S3. The second direction S2 and the third direction S3 form a coordinate system in a horizontal plane in the elevator shaft 20.

Figure 3:
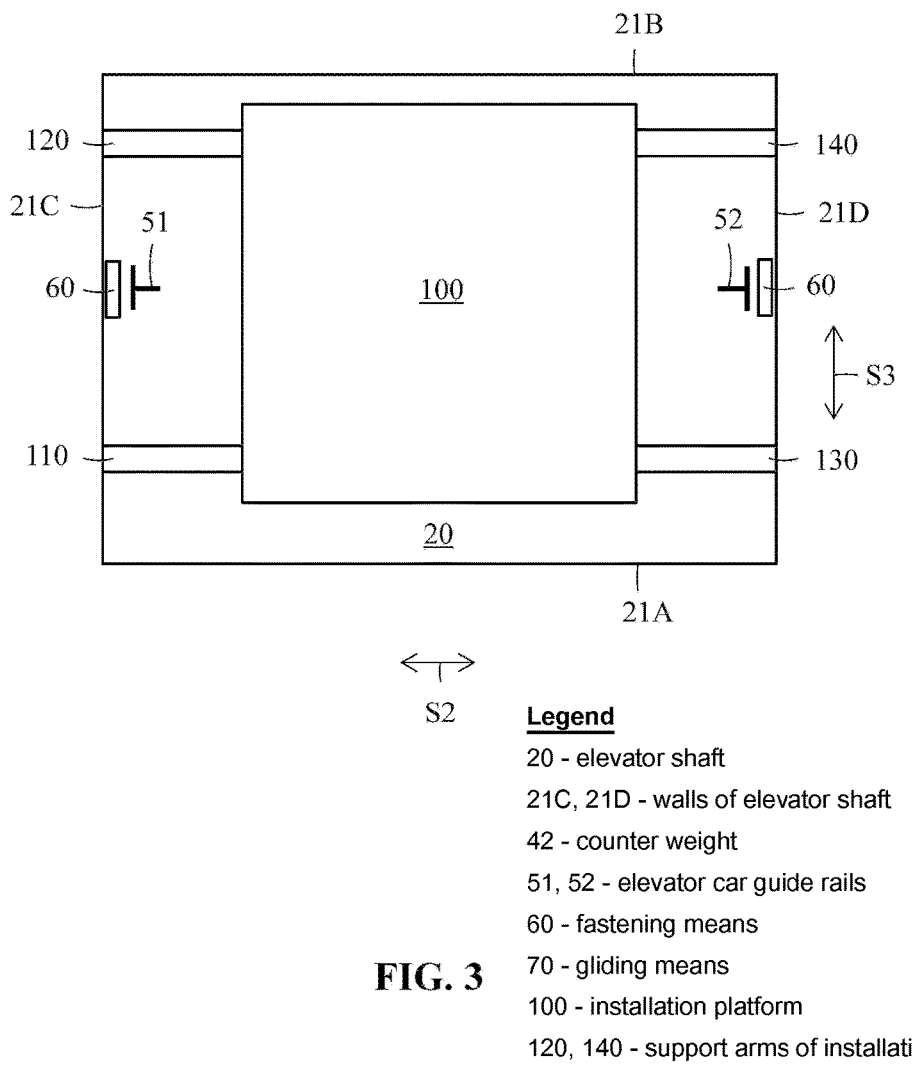
FIG. 3 shows a horizontal cross section of an installation platform in an elevator shaft.

FIG. 3 shows a horizontal cross section of an installation platform in an elevator shaft. The installation platform 100 can be suspended with a hoist from the ceiling 13 of the elevator shaft 20. The installation platform 100 can further be supported with glide means on the car guide rails 51, 52. The installation platform 100 is thereby movable upwards and downwards in the first direction S1 in the elevator shaft 20. The installation platform 100 comprises support arms 110, 120, 130, 140 arranged on opposite sides of the installation platform 100 and being movable in the second direction S2 for supporting the installation platform 100 on the opposite side walls 21C, 21D of the elevator shaft 20. The installation platform 100 can be locked in place in the elevator shaft 20 with the support arms 110, 120, 130, 140.

Figure 4:
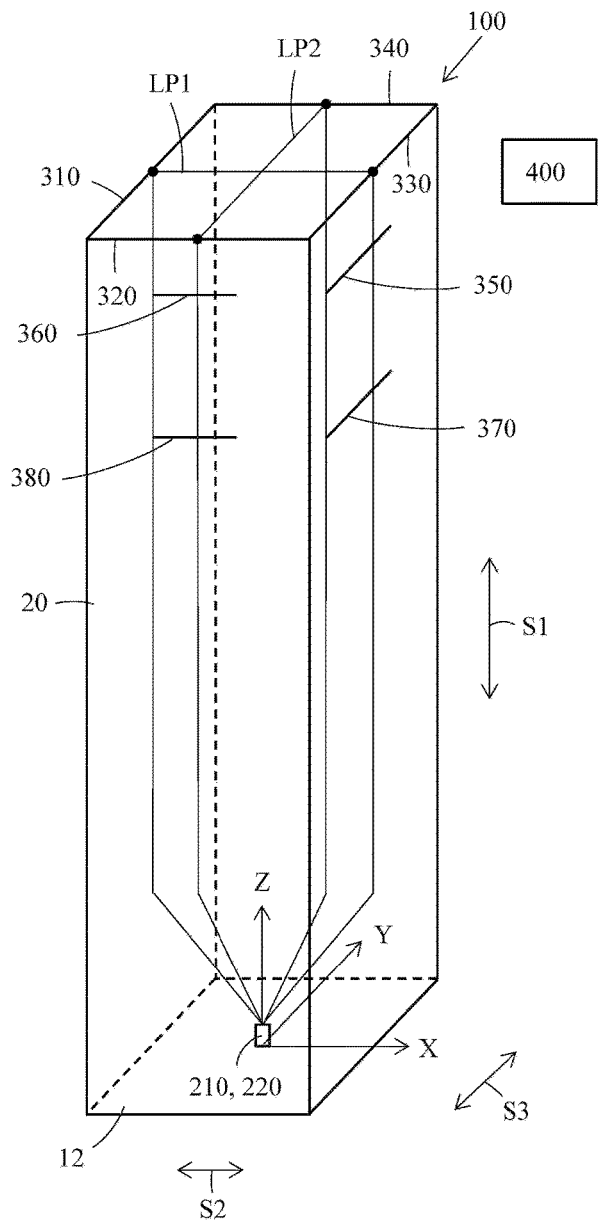
FIG. 4 shows an arrangement for measuring the position of an installation platform in an elevator shaft.

FIG. 4 shows an arrangement for measuring the position of an installation platform in an elevator shaft.

There are two laser transmitters 210, 220 arranged at predetermined positions on the bottom 12 of the elevator shaft 20. Each of the two laser transmitters 210, 220 are based on a laser light source and a rotating mirror. Each of the two laser transmitters 210, 220 produces a vertical upwards directed laser plane LP1, LP2 in the elevator shaft 20. The two vertical upwards directed laser planes LP1, LP2 are perpendicular to each other. The laser plane LP1, LP2 can also be created with an angular movement of the laser light source. The mechanical movement needed in this case is less than 180 degrees, which can be achieved with a rather simple mechanical structure.

There is further a primary light sensitive detector system arranged in connection with a bottom of the installation platform 100. The primary light sensitive detector system comprises four primary light sensitive detectors 310, 320, 330, 340 arranged in a rectangular configuration. Each of the four primary light sensitive detectors 310, 320, 330, 340 is positioned on a side of the rectangle. The first vertical laser plane LP1 intersects with a first pair of two opposite primary light sensitive detectors 310, 330. The second vertical laser plane LP2 intersects with a second pair of two opposite primary light sensitive detectors 320, 340. The primary light sensitive detector 310, 320, 330, 340 gives an output signal indicating the point at which the vertical laser plane LP1, LP2 hits the primary light sensitive detector 310, 320, 330, 340. The output signal of each primary light sensitive detector 310, 320, 330, 340 is transferred to a control unit 400. The position of the installation platform 100 in relation to the two perpendicular laser planes LP1, LP2 can thereby be determined. This means that the X-Y-position of the installation platform 100 in relation to the elevator shaft 20 can be determined in the second direction S2 and in the third direction S3 based on the measurements of the primary light sensitive detectors 310, 320, 330, 340. Also the rotation of the installation platform 100 around the Z-axis can be determined. The position of the vertical upwards directed perpendicular laser planes LP1, LP2 in relation to the elevator shaft 20 is known in the second direction S2 and the third direction S3 based on the predetermined position of the laser transmitters 210, 220 at the bottom 12 of the elevator shaft 20.

Also the orientation of the installation platform 100 can be determined in relation to laser planes LP1 and LP2, if more light sensitive detectors are attached to the installation platform 100. This means, that the measurement method can be expanded from 2D positioning to 5D-positioning (x, y, rot x, rot y, rot z) by including more light sensitive detectors. If e.g. two secondary light sensitive detectors 350, 360 are attached to the installation platform 100 at a predetermined distance below primary light sensitive detectors 310, 320, 330, 340 then the rotation of the installation platform 100 around the X-axis and the Y-axis can be calculated. A first secondary light sensitive detector 350 can be attached to the installation platform 100 at a distance of e.g. 500 mm below the third primary light sensitive detector 330, whereby the rotation of the installation platform 100 around the X-axis can be calculated. A second secondary light sensitive detector 360 can be attached to the installation platform 100 at a distance of e.g. 500 mm below the second primary light sensitive detector 320, whereby the rotation of the installation platform 100 around Y-axis can be calculated.

When doing installations in high-rise buildings, the bending of building caused by wind or thermal expansions because of the heating caused by the sun, can cause bending of the building. Additional light sensitive detectors can be attached to the elevator shaft 20 in order to measure and compensate the effect of the bending of the elevator shaft 20 during installation. At least two tertiary light sensitive detectors could be included to measure lateral movement at a certain height of the building. Including more light sensitive detectors makes it possible to measure also rotations around the X, Y, and Z-axis. Since laser planes LP1 and LP2 cover a large distance in the elevator shaft 20, movements of the building can be measured at different heights. The arrangement may thus further comprise at least two tertiary light sensitive detectors 370, 380 positioned below the installation platform 100. These two tertiary light sensitive detectors 370, 380 are supported on the elevator shaft 20 so that they move with the shaft 20. The first tertiary light sensitive detector 370 measures bending of the elevator shaft 20 around the X-axis and the second tertiary light sensitive detector 380 measures bending of the elevator shaft 20 around the Y-axis. The intersection point of the first laser plane LP1 with the first tertiary light sensitive detector 370 will change when the elevator shaft 20 bends around the X-axis due to the fact that the first tertiary light sensitive detector 370 moves when the elevator shaft 20 bends around the X-axis. The intersection point of the second laser plane LP2 with the second tertiary light sensitive detector 380 will change when the elevator shaft 20 bends around the Y-axis due to the fact that the second tertiary light sensitive detector 380 moves when the elevator shaft 20 bends around the Y-axis. The X- and Y-coordinates define the horizontal position of the installation platform 100 in the elevator shaft 20 and the Z-coordinate define the vertical height position of the installation platform 100 in the elevator shaft 20.

Figure 5:
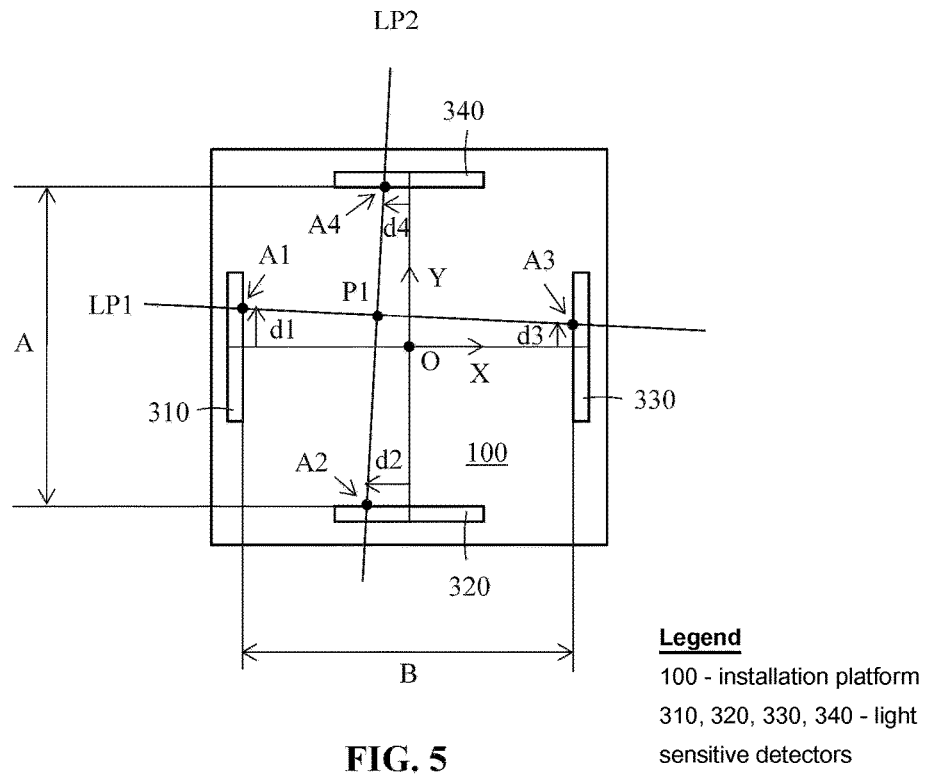
FIG. 5 shows a light sensitive detector arrangement that may be used on an installation platform.

FIG. 5 shows a light sensitive detector arrangement that may be used on an installation platform. The figure shows a situation where the installation platform 100 is displaced in relation to the laser planes LP1, LP2. The intersection O of the straight lines connecting the centre points of the primary light sensitive detectors 310, 320, 330, 340 installed on the installation platform 100 is displaced from the intersection P1 of the straight lines formed by the laser planes LP1, LP2. The distance from the intersection point A1 of the straight line LP1 with the first primary light sensitive detector 310 to the centre line is d1, the distance from the intersection point A3 of the straight line LP1 with the third primary light sensitive detector 320 to the centre line is d3, the distance from the intersection point A2 of the straight line LP2 with the second primary light sensitive detector 320 to the centre line is d2 and the distance from the intersection point A4 of the straight line LP2 with the fourth primary light sensitive detector 340 to the centre line is d4. The distance between the second primary light sensitive detector 320 and the opposite forth primary light sensitive detector 340 is denoted with the reference sign A. The distance between the first primary light sensitive detector 310 and the opposite third primary light sensitive detector 330 is denoted with the reference sign B.

The slope a of the straight line LP1 can be calculated with the following equation (1):

$$a = \frac{d3 - d1}{B} \quad (1)$$

The slope b of the straight line LP2 can be calculated with the following equation (2):

$$b = \frac{a}{d4 - d2} \quad (2)$$

The intersection c of the straight line LP1 with the Y-axis can be calculated with the following equation (3):

$$c = a*0.5*B + d1 \quad (3)$$

The intersection d of the straight line LP2 with the Y-axis can be calculated with the following equation (4):

$$d = b*d2 - 0.5*A \quad (4)$$

The X-coordinate of the point P1 can be calculated with the following equation (5):

$$P1(x) = \frac{d - c}{a - b} \quad (5)$$

The Y-coordinate of the point P1 can be calculated with the following equation (6):

$$P1(y) = a*\left(\frac{d-c}{a-b}\right) + c \quad (6)$$

In a case where the straight line LP2 is parallel with the Y-axis (d4=d2 and d4−d2=0), the X-coordinate of the point P1 can be calculated with the following equation (7):

$$P1(x) = d2 \quad (7)$$

In a case where the straight line LP2 is parallel with the Y-axis (d4=d2 and d4−d2=0), the Y-coordinate of the point P1 can be calculated with the following equation (8):

$$P1(y) = a*(d2 - 0.5*B) + d1 \quad (8)$$

This primary light sensitive detector arrangement makes it possible to measure the position of the installation platform 100 in the X-Y-plane in the elevator shaft 20 i.e. the position of the installation platform 100 in relation to the elevator shaft 20. It is also possible to calculate the orientation i.e. the rotation around the Z-axis with the arrangement.

Figure 6:
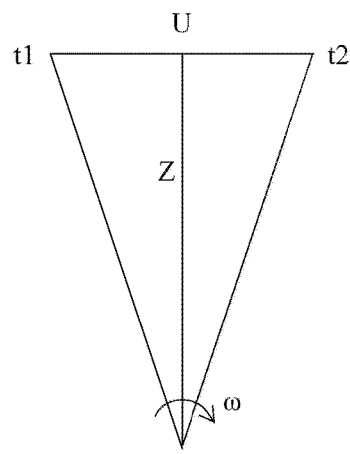
FIG. 6 shows a possibility to calculate the vertical height position of the installation platform.

FIG. 6 shows a possibility to calculate the vertical height position of the installation platform. The vertical height position of the installation platform 100 i.e. the z-coordinate of the installation platform 100 can be calculated with the following equation (9):

$$Z := \frac{0.5*U}{\tan\left(\frac{\omega*t}{2}\right)} \quad (9)$$

where t is the time difference, ω is the angular speed of the laser $2*\pi*i$, U is the distance between two opposite primary light sensitive detectors.

In a situation where the laser 210, 220 rotates with an angular speed ω of 60 rpm and the distance U between the two opposite primary light sensitive detectors 310, 330 or 320, 340 is 1000 mm, the time difference t can be calculated for different vertical distances Z from the above equation. The time difference t is 148 ms when the vertical distances Z is 1 m and 0.4547 ms when the vertical distance Z is 350 m. This means that a 1 ns resolution is needed in order to be able to measure the vertical distance Z at a 1 mm resolution. This is possible, but the electronics to be used becomes rather complex and the rotation speed of the laser must be very stable in order to make such a resolution possible.

The position of the installation platform 100 in relation to the elevator shaft 20 is determined with the primary light sensitive detectors 310, 320, 330, 340 once the installation platform 100 is locked in the elevator shaft 20. When the coordinates of the stationary installation platform 100 have been determined, the coordinates of any apparatus on the installation platform 100 can be determined. The support structure of the apparatus may be stationary supported on the installation platform 100, whereby the apparatus may comprise a robotic arm for performing different tasks. The support structure of the apparatus may on the other hand be movably supported on the installation platform 100, whereby the whole apparatus is movable on the installation platform 100. The position of the apparatus in relation to the elevator shaft 20 can be determined indirectly based on the position of the installation platform 100 in relation to the elevator shaft 20. A sensor system could be used on the installation platform 100 in order to determine the position of the apparatus on the installation platform 100 continuously.

The installation platform 100 may be provided with different installation equipment in the form of one or several robots being movable on the installation platform 100. The installation platform 100 may be supported with gliding means on the opposite car guide rails 51, 52 during the movement in the first direction S1 upwards and downwards in the elevator shaft 20. A hoist may be used to move the installation platform 100 in the first direction S1 upwards and downwards in the elevator shaft 20.

Any kind of commercially available light sensitive detectors 310, 320, 330, 340, 350, 360, 370, 380 can be used in the invention. The light sensitive detector 310, 320, 330, 340, 350, 360, 370, 380 could thus e.g. be formed of a detector having an isotropic sensor surface with a raster-like structure that supplies continuous position data. The light sensitive detector could on the other hand e.g. be formed of a detector having discrete sensors on the sensor surface that supply local discrete data.

The transfer of information and control data between the light sensitive detectors 310, 320, 330, 340 and the control unit 400 may be by wireless communication or by wire. The transfer of information and control data between the apparatuses on the installation platform 100 and the control unit 400 may be by wireless communication or by wire.

The vertical height position of the installation platform 100 can in addition to the method described in connection with FIG. 6 be measured by any conventional as such known method. This could be done by a laser based distance sensor. Another possibility would be to use an absolute multi turn encoder and a measurement wheel for measuring the movement of the installation platform 100. There could be a reference mark in the shaft 20 at which the encoder could be reset.

The laser transmitters 210, 220 should be positioned so that the laser planes LP1, LP2 can pass freely upwards in the elevator shaft 20 to the light sensitive detectors 310, 320, 330, 340, 350, 360, 370, 380. The laser transmitters 210, 220 should be capable of a long range if they are used in a high-rise building. In case the working range of the laser emitters 210, 220 is not sufficient for the whole height of the elevator shaft 20, then the installation could be done in sections so that the laser transmitters 210, 220 are raised between the intervals. Dust or turbulence of the air in the elevator shaft 20 can cause problems at long distances.

The invention can be used with at least two laser transmitters 210, 220.

The laser transmitters 210, 220 may comprise a laser source, a motor which rotate the laser beam in order to convert the laser beam to a laser reference plane, a self leveling system and a single or dual laser plane sloping device. A laser plane transmitter 210, 220 for long range e.g. Leica Rugby 420 DG with the range of 550 mm could be used in the invention. The light sensitive detectors 310, 320, 330, 340, 350, 360, 370, 380 could be e.g. Trimble SR 21 with a length of 1 m and a detection range of 500 m at a resolution of 0.1 mm. There are several commercial light sensitive detectors as well as laser plane transmitters that can be used in the arrangement. For example the Finnish company Dimense has system, which consists of max. 20 light sensitive detectors. This system is intended for the monitoring of movements of large objects, etc. bridges.

The primary light sensitive detectors 310, 320, 330, 340 need not extend along the whole length of the rectangle as can be seen from FIG. 5, but they should be long enough so that the laser planes LP1, LP2 hits the respective primary light sensitive detectors 310, 320, 330, 340 in all circumstances. The same applies to the secondary light sensitive detectors 350, 360 and the tertiary light sensitive detectors 370, 380. A light sensitive detector having a 200 mm long light sensitive area would probably be adequate for most applications.

The use of laser planes LP1, LP2 as plumb lines is advantageous compared to the use of mechanical plumb lines. Mechanical plumb lines are formed by wires, which start to vibrate immediately when they are touched by accident. The measurements have to be interrupted until the wire stops vibrating.

The arrangement and the method can be used in elevator installations where the hoisting height in the elevator shaft is over 30 meter, preferably 30-80 meters, most preferably 40-80 meters.

The arrangement and the method can on the other hand also be used in elevator installations where the hoisting height in the elevator shaft is over 75 meters, preferably over 100 meters, more preferably over 150 meters, most preferably over 250 meters.

The installation platform 100 can be used to install car guide rails 51, 52 and/or counter weight guide rails 53, 54 and/or landing door units.

The use of the invention is not limited to the type of elevator disclosed in the figures. The invention can be used in any type of elevator e.g. also in elevators lacking a machine room and/or a counterweight. The counterweight is in the figures positioned on the back wall of the elevator shaft. The counterweight could be positioned on either side wall of the shaft or on both side walls of the elevator shaft. The lifting machinery is in the figures positioned in a machine room at the top of the elevator shaft. The lifting machinery could be positioned at the bottom of the elevator shaft or at some point within the elevator shaft.

It will be obvious to a person skilled in the art that, as the technology advances, the inventive concept can be implemented in various ways. The invention and its embodiments are not limited to the examples described above but may vary within the scope of the claims.

The invention claimed is:
1. An arrangement for measuring the position of an installation platform in an elevator shaft, comprising:

the installation platform arranged to be movable upwards and downwards in a first direction in the elevator shaft;

two laser transmitters arranged at a bottom of the elevator shaft, each of said two laser transmitters producing a vertical upwards directed laser plane in the elevator shaft, said laser planes being perpendicular to each other; and at least four primary light sensitive detectors attached to the installation platform so that the at least four primary light sensitive detectors are visible to the laser transmitters, each of the at least four primary light sensitive detectors being positioned on a respective side of a rectangle, wherein the position of the installation platform in relation to the elevator shaft can be measured from hitting points of the laser planes on the at least four primary light sensitive detectors.

2. The arrangement according to claim 1, wherein at least two secondary light sensitive detectors are attached to the installation platform at a predetermined distance below the primary light sensitive detectors, whereby the rotation of the installation platform around a horizontal X-axis and a horizontal Y-axis can be measured from the hitting points of the laser planes on the secondary light sensitive detectors.

3. The arrangement according to claim 1, wherein at least two tertiary light sensitive detectors are attached to the elevator shaft at a distance below the primary light sensitive detectors, whereby the bending of the shaft around a horizontal X-axis and a horizontal Y-axis can be measured from the hitting points of the laser planes on the tertiary light sensitive detectors.

4. The arrangement according to claim 1, wherein the installation platform comprises support arms arranged on opposite sides of the installation platform and being movable in a second direction for supporting the installation platform on the opposite side walls of the elevator shaft.

5. The arrangement according to claim 1, wherein a control unit is arranged to control the movement of the installation platform.

6. The arrangement according to claim 5, wherein the at least four primary light sensitive detectors are connected to the control unit so that output signals of the at least four primary light sensitive detectors can be transmitted to the control unit.

7. The arrangement according to claim 1, wherein the arrangement is used in an elevator shaft in a high rise building having a hoisting height of over 75 meters.

8. A method for measuring the position of an installation platform in an elevator shaft, comprising the steps of:

arranging the installation platform to be movable upwards and downwards in a first direction in the elevator shaft;

arranging two laser transmitters at a bottom of the elevator shaft, each of said two laser transmitters producing a vertical upwards directed laser plane in the elevator shaft, said laser planes being perpendicular to each other;

arranging at least four primary light sensitive detectors on the installation platform so that the at least four primary light sensitive detectors are visible to the laser transmitters, each of the at least four primary light sensitive detector being positioned on a respective side of a rectangle; and measuring the position of the installation platform in relation to the elevator shaft from hitting points of the laser planes on the at least four primary light sensitive detectors.

9. The arrangement according to claim 1, wherein the arrangement is used in an elevator shaft in a high rise building having a hoisting height of over 100 meters.

10. The arrangement according to claim 1, wherein the arrangement is used in an elevator shaft in a high rise building having a hoisting height of over 150 meters.

11. The arrangement according to claim 1, wherein the arrangement is used in an elevator shaft in a high rise building having a hoisting height of over 250 meters.

12. The arrangement according to claim 2, wherein at least two tertiary light sensitive detectors are attached to the elevator shaft at a distance below the primary light sensitive detectors, whereby the bending of the shaft around a horizontal X-axis and a horizontal Y-axis can be measured from the hitting points of the laser planes on the tertiary light sensitive detectors.

13. The arrangement according to claim 2, wherein the installation platform comprises support arms arranged on opposite sides of the installation platform and being movable in a second direction for supporting the installation platform on the opposite side walls of the elevator shaft.

14. The arrangement according to claim 3, wherein the installation platform comprises support arms arranged on opposite sides of the installation platform and being movable in a second direction for supporting the installation platform on the opposite side walls of the elevator shaft.

15. The arrangement according to claim 2, wherein a control unit is arranged to control the movement of the installation platform.

16. The arrangement according to claim 3, wherein a control unit is arranged to control the movement of the installation platform.

17. The arrangement according to claim 4, wherein a control unit is arranged to control the movement of the installation platform.

18. The arrangement according to claim 2, wherein the arrangement is used in an elevator shaft in a high rise building having a hoisting height of over 75 meters.

19. The arrangement according to claim 2, wherein the arrangement is used in an elevator shaft in a high rise building having a hoisting height of over 100 meters.

20. The arrangement according to claim 2, wherein the arrangement is used in an elevator shaft in a high rise building having a hoisting height of over 150 meters.

* * * * *